April 28, 1953     R. C. CHURCHMAN     2,636,571
COMBINATION FILTER AND TRAP
Filed March 13, 1948
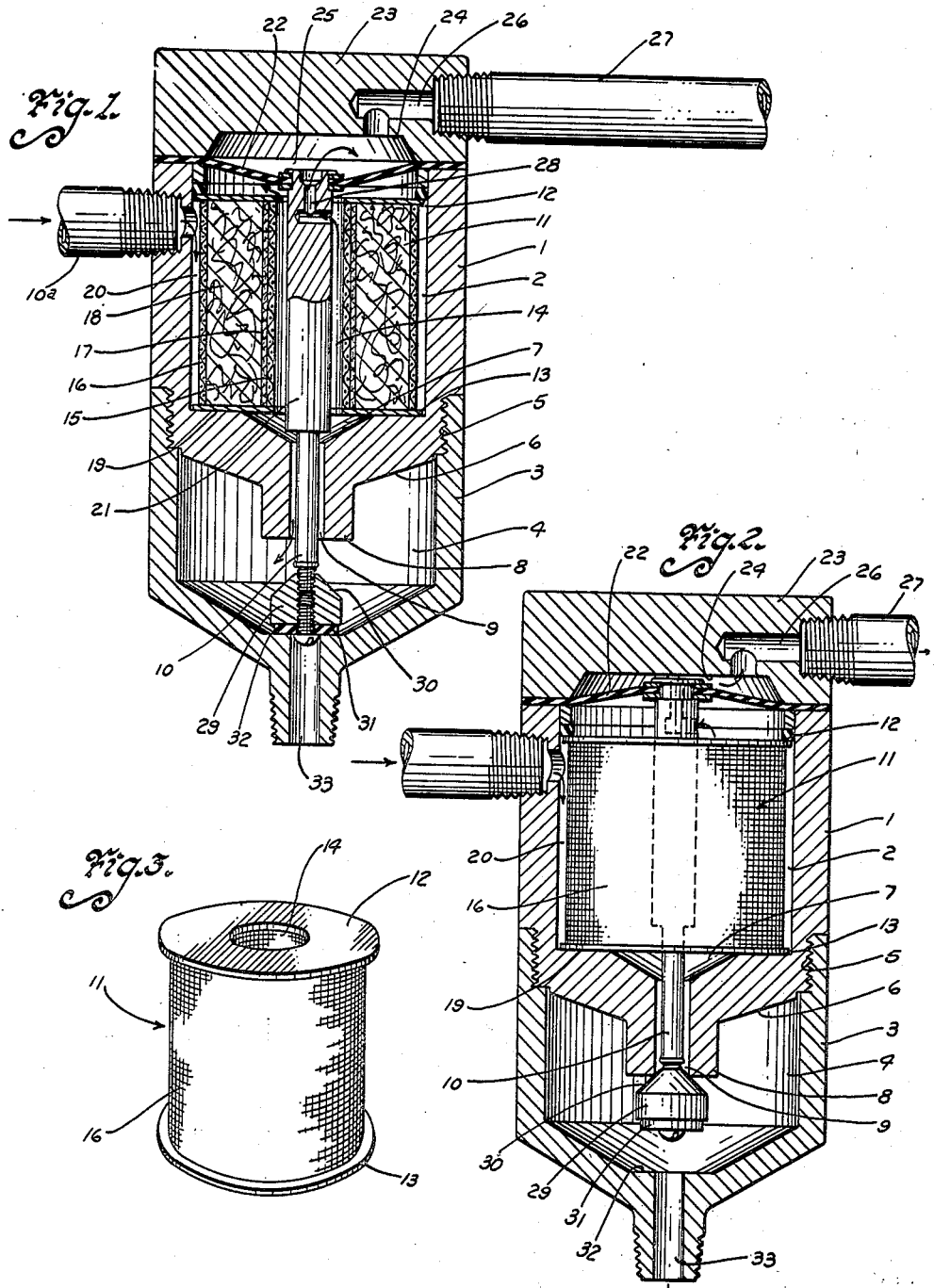
Inventor: Russell C. Churchman
by Harry L. Yinger
Attorney
Witness
Edward P. Seeley Patented Apr. 28, 1953

2,636,571

UNITED STATES PATENT OFFICE 2,636,571

COMBINATION FILTER AND TRAP

Russell C. Churchman, Des Moines, Iowa; Nellie Churchman, executrix of said Russell C. Churchman, deceased Application March 13, 1948, Serial No. 14,667

5 Claims. (Cl. 183—42)

This invention relates to a combination filter and trap to remove moisture from air under pressure and more particularly to a combination filter and trap to be used in a pipe line conducting air under pressure from a compressed air storage tank to a point of use.

In many uses of compressed air in industry, as in paint spraying or where compressed air is used with silica to clean spark plugs, it is absolutely essential that the compressed air be free of moisture. The combination filter and trap is placed in a pipe line as close to the point of use as possible, to remove moisture from the compressed air and furnish a dry air.

It is an object of the invention, among others, to provide a combination filter and trap to be mounted in a pipe line to dry compressed air being taken from the pipe line with said trap being opened automatically to discharge any collected moisture.

It is another object of the invention to provide a combination filter and trap through which air under pressure flows in passing to a point of use wherein any moisture in the compressed air is filtered from the compressed air and collected in a trap with the trap opened intermittently to discharge the collected moisture.

It is still another object of the invention to provide a combination filter and trap through which air under pressure flows in passing to a point of use wherein any moisture in the compressed air is filtered from the compressed air and collected in a trap with said trap opened automatically by the differential of pressure existing between the inlet and outlet of the combination filter and trap when compressed air is withdrawn from the pipe line at the point of use.

It is a still further object of the invention to provide a combination filter and trap that is simple in construction and operation, long lasting and durable in operation, requiring less repair and lost time in operation; a combination filter and trap that is easy to install, simple of design and easy of repair in case of breakdown; and a combination filter and trap that can be supplied and operated at an extremely low cost.

With the foregoing and other objects in view, the invention will be more fully described herewith and will be particularly pointed out in the claims appended hereto.

In the drawings, wherein like symbols refer to like or corresponding parts throughout the several views:

Figure 1 is a cross-sectional view of the combination filter and trap showing the position of the parts when no compressed air is flowing.

Figure 2 is a part sectional and part elevational view showing the position of the parts when compressed air is flowing.

Figure 3 is an elevational view of a filter element placed within a filter chamber of the combination filter and trap.

The combination filter and trap provides a first housing 1 having a chamber 2 within the housing 1 and a second housing 3 with a chamber or trap 4 therein. The housing 3 may be connected to the bottom of the housing 1 as by screw threads 5 and a bottom portion 6 on the housing 1 terminates in a dished sump portion 7 with a portion 8 having an opening 9 extending into the housing 3 and conducting any moisture removed from compressed air passing through the chamber 2 to the chamber or trap 4. The bottom of the portion 8 around the opening 9 presents a seat for a valve head to close off flow through the opening 9.

An inlet 10a attaches to a source of compressed air and enters the compressed air into chamber 2. Depending on the distance the compressed air must travel before it reaches the point of use, change of temperature along the flow line, friction of flow in the flow line and leakage will allow moisture to condense out of the compressed air. It is essential that the compressed air be dry when used for spray painting or cleaning spark plugs wherein an abrasive such as silica is blown by the compressed air against a spark plug. The present structure is placed into the flow line as close the point of use as possible.

The chamber 2 may have a filter element 11 therein or the filter element 11 may be omitted and the structure will operate but not with the efficiency of operation as when the filter element 11 is included. The filter element 11 has end pieces 12 and 13 which may be made of steel, spaced apart longitudinally with the body of the filter 11 between the end pieces 12 and 13. Each end piece 12 and 13 has a central opening and the body of the filter has an opening 14 through the center of the filter body to form a passage through the filter 11. The body of the filter 11 may be a center core 15 of copper screen wire of approximately 140 mesh, and an outer screen 16 of approximately 100 mesh. A felt layer 17 is placed next the inner screen 15 and the remaining space is filled with spun metal of brass or copper 18. The smaller mesh screen 15 over the screen 16 allows a pressure drop of compressed air through the filter 11 and thus makes a slight pressure differential through the filter body.

The filter 11 fits within the housing 1 in the chamber 2 and the bottom piece 13 of the filter body seats and seals with the ledge 19 within the housing 1 and leaves a space 20 between the housing 1 and the filter 11. All compressed air entering the chamber 2 through the inlet 10a, enters the space 20 and must pass through the filter body to the passage 14. Any water present in the compressed air will be removed by the filter 11. The water will flow by gravity through the filter body and inner screen 15 to the passage 14, then to the sump portion 7 through opening 9 and finally the water is collected in the chamber or trap 4 of the housing 3.

Within the passage 14 of the filter and extending into the chamber 4 of the housing 3 is a valve stem 21 having a reduced lower portion 18. The valve stem 21 is attached at its top to a diaphragm 22. The diaphragm 22 extends across the top of the housing 1 and is clamped into place across the top of the housing 1 by a cap member 23 attached in any suitable manner to the housing 1. The cap member 23 when clamped to the housing 1 also compresses a packing between the diaphragm 22 and the top piece 12 of the filter 11 to seal the space 20 at the top so that all air under pressure entering at the inlet 10a must pass through filter 11. The diaphragm 22 is made of a material impervious to air flow therethrough and rubberized fabric has been found suitable for this purpose.

The cap member 23 is dished at 24 so as to form a chamber 25 between the diaphragm 22 and the top of the dished portion 24. An opening 26 in the cap member 23 connects to a pipe 27 to provide an outlet from the chamber 25 to the point of use for the compressed air.

The valve stem 21 connects to the diaphragm 22 by riveting as shown or by any suitable means. The top of the valve stem 21 has an opening 28 therein connecting the opening 14 in the filter 11 with the chamber 25 so air passing through the filter 11 can flow to the chamber 25 through the opening 28 and thence to the outlet 26 and pipe 27. On the other end of the valve stem 21 is a valve head 29, the top 30 of which is conical in shape and adapted to seat in the opening 9 when the valve stem 21 is in its extreme upward position to close off the opening 9. The lower portion of the valve head 29 has a gasket 31 attached thereto which seats on ledge 32 in housing 3 to close off the opening 33 which leads to a point of disposal for separated moisture.

In operation of the combined filter and trap, Figure 1 shows the position of the parts when no compressed air flows through the filter 11. No compressed air is flowing to the point of use, hence pressure will equalize on each side of the diaphragm 22.

When compressed air is used at the point of use, compressed air will flow from pipe 27 and chamber 25 to the point of use. The opening or orifice 28 in the top of valve stem 21 must be smaller or the same size as the outlet opening in the pipe 27 leading to the point of use of the compressed air and the distance between the opening or orifice 28 and the outlet from pipe 27 is preferably not more than several feet. This provides a differential of pressure on each side of the diaphragm 22, with the greater pressure being on the under side of the diaphragm 22, which forces the parts of the structure into the position of Figure 2. The compressed air entering the housing 1 into the chamber 2 through inlet pipe 10a has frictional losses in passing through the filter 11; the size of the opening 28 is restricted and the opening 28 is made so as to have a tortuous path, hence there is a loss of pressure, which loss may not be great, between the opening 14 in the center of the filter 11 and the chamber 25 in the cap 23. The size of the opening 28 in the valve stem 21 may be varied to give any desired lift. For quicker operation, if desired, screws with smaller opening could be entered into the top of valve stem 21 to give different sized openings 28.

When compressed air flows through pipe 27, the diaphragm 22 is lifted upwardly to the position of Figure 2, by the differential of pressure existing between the opening 14 and chamber 25. The upward movement of the diaphragm 22, also lifts the valve stem 21 upwardly until the top conical portion 30 on valve head 29 seats against the lower end portion of the portion 8 of the upper housing 1 to close off the opening 9 and hence close off communication between the chamber 2 in housing 1 and the chamber 4 in the housing 3. At the same time, the gasket 31 is lifted off the ledge 32 and opening 33 is opened to the atmosphere.

Compressed air in passing through the filter 11 has any moisture contained therein separated from the air. The moisture flows downwardly through the filter 11 by gravity, to sump portion 7 which guides the moisture into opening 9. In the position of Figure 2, the opening 9 is closed, hence any collected moisture collects in opening 9. In this position the chamber 4 in housing 3 is open to the atmosphere, the collected moisture drains out through opening 33 and the pressure in chamber 4 becomes atmospheric.

When the outlet to the point of use for the compressed air is closed, flow through pipe 27 ceases, hence the pressure on each side of diaphragm 22 becomes the same. The valve head 29 that is seated against portion 8 closing off opening 9 is thus subjected to the pressure of air in opening 9 which acts against the valve head 29 to force the valve stem 21 off the portion 8 and the valve stem 21 downwardly. The valve stem 21 is given the initial kick downwardly, off portion 8 by a momentarily high pressure due to inertia built up in chamber 25 and as the valve head 29 approaches ledge 32, flow of air under pressure to opening 33 is restricted, and the pressure of air in chamber 4 can build up against valve head 29 and gasket 31 is seated against ledge 32 in sealing engagement and closes off opening 33. Moisture then drops from opening 9 to the chamber 4 and is now ready to be discharged the next time valve head 29 is unseated from opening 33.

It will be understood that the invention has been described for purposes of illustration and explanation and that changes and variations are possible without departing from the scope of the invention; all such modifications and changes are intended to be included in the appended claims.

I claim:

1. An apparatus for removing and collecting moisture from air under pressure with an automatic disposal of the collected moisture, comprising a housing member having at least two compartments forming respectively a chamber and trap, a passageway communicating with said chamber and trap, an opening in said trap communicating with the outside atmosphere, a diaphragm secured to the top of said chamber;

said diaphragm movable in response to an air pressure differential on opposite sides thereof, an inlet and outlet in said housing, a valve plunger mounted in said housing and secured at one end to said diaphragm and extending therefrom through said chamber into said trap, a valve head on the free end of said valve plunger and movable within said trap; said valve head constructed and arranged whereby movement of the diaphragm in one direction will cause said valve head to seat in the passageway between said chamber and said trap and movement of the diaphragm in the opposite direction will cause said valve head to seat in said opening in said trap.

2. An apparatus for removing and collecting moisture from air under pressure with an automatic disposal of the collected moisture, comprising, a housing member having at least two compartments forming respectively a chamber and trap, a passageway communicating with said chamber and trap, an opening in said trap communicating with the outside atmosphere, a diaphragm secured to the top of said chamber; said diaphragm movable in response to an air pressure differential on opposite sides thereof, an inlet and outlet in said housing, a valve plunger mounted in said housing and secured at one end to said diaphragm and extending therefrom through said chamber into said trap, a valve head on the free ends of said valve plunger and movable within said trap in response to movement of said diaphragm; said valve head being of conical shape on top whereby it can seat in said passageway at times and is further designed to seat in said opening in said trap at times and constructed and arranged so that movement of said diaphragm in one direction will move said valve head whereby the passageway between said chamber and trap is closed while the opening in said trap is open and movement of said diaphragm in the opposite direction will move said valve head whereby the opening in said trap is closed while the passageway between said chamber and trap is open.

3. An apparatus for removing and collecting moisture from air under pressure with an automatic disposal of the collected moisture, a housing having at least two compartments forming respectively a chamber and a trap, a passageway communicating with said chamber and trap, an opening in said trap communicating with the outside atmosphere, an inlet in said housing communicating with said chamber, a cap member secured to the top of said housing to form a second chamber, a diaphragm impervious to the flow of air secured intermediate said first mentioned chamber and second chamber; said diaphragm movable in response to an air pressure differential respectively in said first mentioned chamber and said second chamber, a valve plunger in said housing having its upper end secured to said diaphragm so that said plunger is movable in two directions respectively with said diaphragm; said plunger extending from said diaphragm through said first mentioned chamber into said trap, an air passageway in said valve plunger communicating with said second chamber, and a valve head on the free end of said plunger; said valve head capable of closing the opening in said trap at times and capable of closing the passageway between said chamber and trap at times.

4. An apparatus for removing and collecting moisture from air under pressure with an automatic disposal of the collected moisture, comprising, a housing member having at least two compartments forming respectively a chamber and trap, a passageway communicating with said chamber and trap, an opening in said trap communicating with the outside atmosphere, a diaphragm secured to the top of said chamber; said diaphragm movable in response to an air pressure differential on opposite sides thereof, an inlet and outlet in said housing, a filter member in said chamber intermediate said inlet and outlet; said filter designed to remove moisture from air under pressure, a valve plunger mounted in said housing and secured at one end to said diaphragm and extending therefrom through said filter member and chamber into said trap, a passageway between said valve plunger and said filter communicating with said inlet and outlet, a valve head on the free end of said valve plunger and movable within said trap; said valve head constructed and arranged whereby movement of the diaphragm in one direction will cause said valve head to seat in the passageway between said chamber and said trap and movement of the diaphragm in the opposite direction will cause said valve head to seat in said opening in said trap.

5. An apparatus for removing and collecting moisture from air under pressure with an automatic disposal of the collected moisture, a housing having at least two compartments, forming respectively a chamber and a trap, a filter member in said chamber in communication with said inlet; said filter designed to remove moisture from air under pressure, a passageway communicating with said chamber and trap, an opening in said trap communicating with the outside atmosphere, an inlet in said housing communicating with said chamber, a cap member secured to the top of said housing to form a second chamber, a diaphragm impervious to the flow of air secured intermediate said first mentioned chamber and said second chamber; said diaphragm movable in response to an air pressure differential respectively in said first mentioned chamber and said second chamber, an outlet in said second chamber, a valve plunger in said housing having its upper end secured to said diaphragm so that said plunger is movable in two directions respectively with said diaphragm; said plunger extending from said diaphragm through said filter and said first mentioned chamber into said trap, an air passageway in said valve plunger communicating with said second chamber, a second passageway between said valve plunger and said filter communicating at respective ends with said inlet and said first mentioned air passageway, and a valve head on the free end of said plunger; said valve head capable of closing the opening in said trap at times and capable of closing the passageway between said chamber and trap at times.

RUSSELL C. CHURCHMAN.

References Cited in the file of this patent

UNITED STATES PATENTS

| Number | Name | Date |
|---|---|---|
| 734,627 | Southerland | July 28, 1903 |
| 1,814,100 | Waterman | July 14, 1931 |
| 2,058,189 | Stuard | Oct. 20, 1936 |